US012007105B2

(12) United States Patent
Ladstätter et al.

(10) Patent No.: US 12,007,105 B2
(45) Date of Patent: Jun. 11, 2024

(54) MOUNTING RAIL SYSTEM WITH A TAPPING ELEMENT

(71) Applicant: ZUMTOBEL LIGHTING GMBH, Dornbirn (AT)

(72) Inventors: Gerald Ladstätter, Klaus (AT); Gregor Mayr, Gaißau (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 18/251,280

(22) PCT Filed: Nov. 25, 2021

(86) PCT No.: PCT/EP2021/082969

§ 371 (c)(1),
(2) Date: May 1, 2023

(87) PCT Pub. No.: WO2022/112403

PCT Pub. Date: Jun. 2, 2022

(65) Prior Publication Data

US 2023/0400176 A1 Dec. 14, 2023

(30) Foreign Application Priority Data

Nov. 30, 2020 (DE) ..................... 10 2020 131 628.3

(51) Int. Cl.
*F21V 21/35* (2006.01)
*F21S 8/00* (2006.01)
*F21V 23/06* (2006.01)

(52) U.S. Cl.
CPC .............. *F21V 21/35* (2013.01); *F21V 23/06* (2013.01)

(58) Field of Classification Search
CPC ........... F21V 21/34; F21V 21/35; F21S 8/038
See application file for complete search history.

(56) References Cited

U.S. PATENT DOCUMENTS

| | | | | |
|---|---|---|---|---|
| 3,559,146 A * | 1/1971 | Valtonen | H01R 25/14 | 439/94 |
| 3,676,830 A * | 7/1972 | Donato | F21V 21/35 | 439/118 |
| 2016/0104985 A1 | 4/2016 | Ewing et al. | | |

FOREIGN PATENT DOCUMENTS

| | | |
|---|---|---|
| DE | 10025648 A1 | 11/2001 |
| GB | 2067363 A | 7/1981 |
| JP | S6369498 U | 5/1988 |

OTHER PUBLICATIONS

PCT/EP2021/082969, International Search Report and Written Opinion, dated Mar. 21, 2022, 6 pages.

* cited by examiner

*Primary Examiner* — Sean P Gramling
(74) *Attorney, Agent, or Firm* — Andrus Intellectual Property Law, LLP

(57) ABSTRACT

The present invention relates to a mounting rail system (100) comprising a mounting rail (1) with an elongate profiled mounting rail (2) which has a longitudinal extent (L), delimits an interior (I) and has an elongate coupling opening (20), and an elongate busbar (4), which extends longitudinally (L) in the interior (I) of the profiled mounting rail (2), wherein the busbar (4) has at least one electrical conductor (40) for electrically connecting electrical or electronic components (30) via the coupling opening (20). The mounting rail system (100) further has a tapping element (10), which is detachably inserted into the interior (I) via the coupling opening (20) and byway of a contact portion (5) is electrically coupled to the busbar (4). The tapping element (10) further has a supply element (6), which is provided on the outside in relation to the mounting rail (1) and is electrically connected by way of electrical connecting element (7) to the contact portion (5) via an opening (24), independent of the (Continued)

coupling opening (20), in the profiled mounting rail (2) in order to supply the electrical tapping by the contact portion (5) from the busbar (4) via the supply element (6) on the outside.

20 Claims, 10 Drawing Sheets

MOUNTING RAIL SYSTEM WITH A TAPPING ELEMENT

CROSS-REFERENCE TO RELATED APPLICATION

The present application is the U.S. national stage application of international application PCT/EP2021/082969 filed Nov. 25, 2021, which international application was published on Jun. 2, 2022 as International Publication WO 2022/112403 A1. The international application claims priority to German Patent Application 10 2020 131 628.3, filed Nov. 30, 2020.

TECHNICAL FIELD OF THE INVENTION

The present invention relates to a (light) mounting rail system comprising a mounting rail with an elongate profiled mounting rail and an elongate busbar extending therein, as well as tapping elements for electrically tapping from the busbar.

BACKGROUND OF THE INVENTION

Mounting rails of the aforementioned type are known in principle from the prior art. They are generally used in order to receive and supply electrical and electronic components, such as lamps and light strip components, in order form a light mounting rail system. Also, further electrical or electronic components, for example speakers or sensors and the like, can be provided in or on corresponding mounting rails or profiled mounting rails and electrically coupled to the busbar, for example. The Internet of Things (IoT) increasingly offers new possibilities for use for a variety of additional components, such as the use of radio beacons, sensors of all kinds, and so forth.

The increasing use of electrical or electronic components on such mounting rail systems ensures that these systems are heavily loaded with corresponding components so that they are often in one another's way, or a functional collision can occur. A frequent function of such mounting rail systems, namely accommodating lights for light output, is also increasingly limited by the use of further electrical and electronic components, such as IoT components, which often extend spatially into the light output area.

Nevertheless, the use of electrical or electronic components is of great importance, in particular in combination with mounting rails.

Thus, a problem addressed by the present invention is to provide a mounting rail system which offers connection possibilities for electrical or electronic components in a simple and flexible manner.

SUMMARY OF THE INVENTION

According to a first aspect, the present invention therefore relates to a mounting rail system for a mounting rail and a tapping element. The mounting rail in turn comprises an elongate profiled mounting rail with a longitudinal extent, which preferably extends along a longitudinal direction. The profiled mounting rail delimits an interior and also has an elongate coupling opening. The mounting rail further comprises an elongate busbar, which extends longitudinally in the interior of the profiled mounting rail. The busbar comprises at least one electrical conductor for electrically connecting electrical or electronic components. The tapping element is detachably inserted into the interior via the coupling opening and is electrically coupled to the busbar by way of a contact portion. The process of inserting and accommodating the tapping element thus preferably occurs entirely via the coupling opening, in which case ultimately the entire tapping element does not need to be placed in the interior in the installed state, as will be described further. The tapping element further has a supply element, which is provided on the outside in relation to the mounting rail and is electrically connected by way of electrical connecting element to the contact portion via an opening, independent of the coupling opening, in the profiled mounting rail in order to supply the electrical tapping by the contact portion from the busbar via the supply element on the outside.

Such a mounting rail system allows a tapping element to be provided at least partially, i.e., at least with its contact portion, within the profiled mounting rail and thus directly coupled (electrically) to the busbar. At the same time, the electrical tapping performed in this way is guided outwardly via the connecting element in relation to the mounting rail system, without colliding with the coupling opening. Via the supply element then placed outwardly in this manner, the electrical tap can be provided outwardly in a simple manner, for example for the transfer of power, data, etc. Because the supply element can be chosen as desired, the mounting rail system can provide a particularly flexible array of variants of the supply. For example, the supply element can be an electrical or electronic component itself, or preferably also a (standard) interface. Because the tapping element directly accesses the elongate busbar, it can be provided at any location longitudinally. The connecting element can then be manufactured in such a manner (e.g., length, shape, etc.) that it can extend outwardly from the position of the contact portion through the opening to the supply element. A particularly simple and flexible connection option for electrical or electronic components is thus provided. Because the opening is also provided independently, i.e. separately, from the coupling opening, the corresponding electrical or electronic components can be provided at positions that do not interfere with the function (for example, light output) of the components provided via the coupling opening.

Preferably, the contact portion is completely accommodated in the interior. Thus, the part of the tapping element lying in the profiled mounting rail can be provided in a hidden manner without impeding the functionality of the tapping element.

The contact portion preferably comprises a rotary tap with contact elements, which is movable, i.e. in particular rotatable, between an insertion position in which the contact elements are retracted and a contacting position in which the contact elements are extended for contacting the busbar. In this way, a simple electrical coupling of the contact portion to the busbar can occur. The tapping element is thus inserted into the interior via the coupling opening, for example, and is then electrically coupled to the busbar by means of a rotational movement of the rotary tap of the contact portion.

Preferably, the contact portion comprises an adjustment portion for selectively adjusting the electrical tapping from the busbar towards the supply element. An adjustment can in this case be, e.g., the adjustment of voltage, current, frequency, or the like. In this respect, the adjustment portion can be, for example, a transformer, an operating device, a current transformer, another power bridge such as a power and/or data bridge, or the like. Thus, the electrical tap can be adapted selectively to be supplied via the supply element accordingly and thus adapted in order to suitably accommodate an electrical or electronic component to be connected thereto.

Preferably, the contact portion, preferably its adjustment portion, can comprise an interface portion. The first connection can preferably form a part of a standard interface, such as HMDI, USB, barrel plug connection, mains plug connection, network plug connection, for example for LAN cable with Power-over-Ethernet (PoE). The contact portion can thus be configured such that connection to the latter via preferably standardized interfaces is possible in a particularly simple manner. For example, the end of the connection element facing the contact portion can then comprise a corresponding part of the standard interface for electrically coupling to the part of the standard interface of the contact portion. This further increases the flexibility of the mounting rail system, because in this way the connecting element is also easily provided exchangeably. An additional external source (e.g., ethernet access) is connected to the interface portion via a corresponding cable, and thus its function (e.g., the transfer of data) is provided on the tapping element and preferably towards the provision section.

The supply element can be a part of, or can comprise, a standard interface, such as HMDI, USB, barrel plug connection, mains plug connection, network plug connection, for example for LAN cable with Power-over-Ethernet (PoE). Preferably, this can be a standardized socket or a standardized plug for providing the electrical tap on the outside. It is also conceivable that the end of the connecting element facing the supply element has a corresponding part of the standard interface for electrical coupling to the part of the standard interface of the supply element, so that the supply element is exchangeable or couplable in a flexible manner.

The connecting element particularly preferably comprises a cable, or also another electrical conductor, for example a conductor busbar. Thus, any connecting element, in particular a simple one, can be provided.

The opening is preferably provided on a side of the profiled mounting rail facing away from the coupling opening. Thus, the outwardly guided provision of the electrical tap can be provided on a side facing away from the visible side of the mounting rail system, so that the aesthetics of the mounting rail system is influenced as little as possible. The rear provision can also best avoid obstruction of the functional portions (e.g., for light output) of the mounting rail system towards the coupling opening. Of course, it is also conceivable that the opening is provided in another area of the profiled mounting rail, e.g. laterally.

The profiled mounting rail can preferably comprise a plurality of the openings, which are preferably arranged along the length of the profiled mounting rail; preferably evenly (e.g., every 50 cm). In this way, a plurality of such tapping elements can preferably be provided over the entire length of the mounting rail system at any desired positions. This in turn increases the flexibility of the mounting rail system. It is of course conceivable that a plurality of connecting elements can also extend outwardly via an opening to one or more tapping elements.

Preferably, the profiled mounting rail further comprises one or more terminal openings that are independent of the coupling opening. The busbar can be electrically contactable from the outside via the latter, for example (preferably directly). Alternatively or in addition, it is conceivable that further electrical conductors from the outside (preferably directly) can also be electrically contactable via the terminal opening(s), which conductors preferably extend longitudinally in the interior of the profiled mounting rail. For example, these conductors can be low voltage lines (e.g., 48V leads), to which a corresponding component can, e.g., be directly electrically connected. The flexibility and functionality of the mounting rail system can thus be further increased.

The described further electrical conductors can in particular preferably be electrically contactable via the interior. Further components can thus also be connected via the interior to these additional conductors so that the flexibility and functionality of the mounting rail system can be further increased.

The opening as well as the at least one terminal opening can be arranged in a defined hole pattern relative to one another. According to this hole pattern, plug portions can be configured for components to be connected from the outside, for example, by means of which a secure and clear connection of these components via the openings is enabled. For example, it is conceivable that a corresponding component is electrically contacted by means of such a plug section via the terminal openings with the further electrical conductors and/or the busbar, and the opening also receives a protruding part of the component to be connected, in order to enable a clear orientation of the component as well as secure electrical and mechanical contacting of the same.

The opening as well as the at least one terminal opening can be spaced separately or also integrally formed with one another, i.e., as separate contour areas or as a continuous opening, e.g., with corresponding contour portions. Thus, these openings can be designed as desired according to requirements.

Preferably, a plurality of these hole patterns are preferably arranged along the length of the profiled mounting rail; particularly preferably evenly. Thus, the thus defined connection possibility can preferably be provided via a uniform hole pattern over the entire length of the mounting rail system, which further increases the flexibility of the mounting rail system.

The mounting rail system can further comprise a cover for optionally covering the opening and, if present, the associated terminal opening(s). Thus, it is possible to cover the respective openings when not in use and preferably to seal them outwardly. This way, unwanted access can be avoided. In addition, preferably the penetration of dust, debris, and, if applicable, water is also avoided if the cover has a sealing function compared to the profiled mounting rail, i.e., is made of or comprises a sealing material, for example.

The cover is preferably provided so as to be rotatably and/or translationally movable. For example, the cover can be provided rotatably via a pivoting joint. Particularly preferably, the cover is provided along the length of the profiled mounting rail. A simple and space-saving movement of the cover can thus be enabled.

According to a preferred embodiment, the profiled mounting rail can have coupling structures via which the cover is mechanically coupled to the profiled mounting rail and preferably movably supported on the profiled mounting rail. Preferably, these coupling structures can be (rear) coupling structures for fastening the mounting rail system (e.g., on a wall or a beam, such as a suspension system) so that they can be used simultaneously for the storage of the cover, and thus the mounting rail system as a whole can be simply constructed.

The cover can further comprise alignment structures. Preferably, these are provided on a bottom facing towards the profiled mounting rail. By means of these alignment structures, it should be possible to selectively align an end of the connecting element which is guided outwardly from the opening. The alignment structures preferably extend longitudinally or in the longitudinal direction of the profiled mounting rail. For example, it can be enabled that the connecting element is guided outwardly in the form of a cable. By closing the cover, for example by means of a longitudinally slidable, translational movement along the profiled mounting rail, the cover is then pushed over the opening so that the alignment structures partially receive the connecting element and then align the connecting element according to its orientation, preferably longitudinally in this case. A defined positioning of the connecting element can thus be achieved. In addition, the connecting element can also be provided in a space-saving manner. In addition, it can be enabled so that the function of the cover, i.e., the covering of the apertures, can be enabled even when a connecting element is guided through the apertures.

The profiled mounting rail can preferably be U-shaped, C-shaped, or H-shaped in cross-section towards the longitudinal extent or when viewed in the longitudinal direction. A particularly simple profiled mounting structure is thus provided, which provides a corresponding interior.

The profiled mounting rail can preferably comprise two substantially parallel aligned side wall legs and one transverse wall leg connecting these side wall legs. The opening and, if present, the associated coupling opening(s) are preferably provided in the transverse wall leg, but can also be provided in at least one or both of the side wall legs. The coupling opening is then preferably laterally delimited or formed by the distal ends of the side wall legs relative to the transverse wall leg. Thus, an overall simple and stable profiled mounting rail can be provided in order to form a corresponding interior.

The busbar can preferably be arranged on an inner wall of the profiled mounting rail, preferably at least on one of the legs of the side wall legs and the transverse wall leg. In one preferred embodiment, two busbars are provided on the inner wall of the two opposing side wall legs. In principle, the busbar described can be provided at any position in the interior, or along the profiled mounting rail. A plurality of busbars can also be provided for each mounting rail system or each mounting rail.

Preferably, the mounting rail system can further comprise an electrical or electronic component with a terminal portion for connection to the supply element and thus for electrical coupling to the busbar. Alternatively or additionally, the component can comprise a terminal portion for direct electrical connection with the busbar and/or the further electrical conductors via the terminal opening(s). In the latter case, it is further conceivable that the terminal portion also comprises a structural portion that corresponds to the opening; i.e., preferably engages the opening in order to achieve a defined positioning or to achieve orientation or alignment of the electrical or electronic component in the case of an electrical connection via the terminal opening(s). Overall, the possibility of corresponding electrical or electronic components is diverse so that a particularly flexible and variable mounting rail system can be provided. It is also conceivable that the supply element comprises the electrical or electronic component.

The electrical or electronic component can further comprise an assembly portion, by means of which the component can be mechanically coupled to the profiled mounting rail. The assembly portion can preferably comprise profiled portions in order to be mechanically coupled to the coupling structures, or further coupling structures, of the profiled mounting rail. In a preferred embodiment, the component, which is mechanically coupled in this manner, can preferably further be provided longitudinally or slidably in the longitudinal direction of the profiled mounting rail. Thus, a corresponding component as a whole can also be mechanically coupled to the profiled mounting rail in a simple manner in order to thus supply it with certainty. By further providing the component in a longitudinally slidable manner, the positioning of the same is further simplified. Particularly preferably, the component is provided at the rear of the profiled mounting rail in relation to the coupling opening, so that the component is provided as far apart as possible in relation to a functional portion of the mounting rail system, i.e., in relation to the coupling opening, in order to thus supply a corresponding functional area (e.g., light output area) in relation to the mounting rail system. In addition, it can thus be easily enabled to supply, for example, a closed light strip at the front side, i.e. the coupling opening, while at the same time providing numerous additional electrical or electronic components without obstructing the functional area (i.e., the main light output direction).

The assembly portion preferably has a U-shape or C-shape in order to at least partially encompass the profiled mounting rail; this is preferable for mechanical coupling to the profiled mounting rail. A particularly secure and preferably visually appealing provision of a component on the support (profile) rail can thus be enabled.

The electrical or electronic component can preferably be a light, in particular a spotlight or a gooseneck light or an indirect light or a wall-washer light or an emergency light, a sensor, in particular a motion sensor or a brightness sensor, a radio beacon, a WLAN repeater, a radio access point such as a WLAN access point or a 5G access point, a speaker, a camera, a fan, a fire detector, and/or an adapter with a part of a standard interfaces, such as HMDI, USB, barrel plug connection, mains plug connection, network plug connection, for example for LAN cable with Power-over-Ethernet (PoE). In principle, the invention is not limited to certain electrical or electronic components, so that any conceivable component can generally be provided accordingly, so that the mounting rail system can supply numerous functions in any way and combination.

The mounting rail system can further comprise at least one cover element, which can be detachably connected to the profiled mounting rail in order to at least partially cover the coupling opening. The cover element is preferably configured or provided in such a way that, in the assembled state, it further covers or can cover at least a part of the cover element or the contact portion. The coupling opening can thus be closed on the one hand and thus protected from being accessed. On the other hand, the contact portion of the tapping element can be securely hidden, which is advantageous not least for aesthetic reasons. For this purpose, the tapping element or its contact portion on the one hand and the cover element on the other hand can be mechanically attachable in different assembly planes. The assembly plane of the cover element can preferably be arranged or can extend between the assembly portion of the tapping element on the one hand and the coupling opening on the other hand. Preferably, the assembly planes extend parallel to one another; and these in turn parallel to the extension direction of the coupling opening.

The cover element can have any form of functional element. For example, the cover element in its simplest configuration can be an aperture with which the coupling opening can be simply covered. The aperture can aesthetically terminate the mounting rail system outwardly. Alternatively or additionally, it is conceivable that the cover element is or comprises an electrical or electronic component. The electrical or electronic component is particularly preferably electrically couplable to the busbar. For this purpose, the electrical or electronic component, as also comparable to the contact portion, can comprise a rotary tap with contact elements, which can be moved between an insertion position in which the contact elements are retracted and a contacting position in which the contact elements are extended for contacting with the busbar.

Preferably, the electrical or electronic component can be a light, in particular a light strip light or a spotlight, an operating device, and/or a sensor, in particular a motion sensor or a brightness sensor. Any other electrical or electronic components are also conceivable. The mounting rail system can thus be provided in numerous ways in a flexible and varied manner.

The tapping element can further comprise a functional element having a functional portion. The functional portion is preferably provided so as to be exposed to the outside via the coupling opening when the tapping element is assembled. The functional portion is preferably longitudinally laterally adjacent to at least one of the cover elements, if present; preferably also between at least two cover elements. Preferably, the cover elements as well as the functional portion together cover the coupling opening completely. It is thus possible to supply a functional portion by means of the tapping element also towards the front side of the mounting rail system, i.e., towards the coupling opening, and thus to supply the electrical tapping of the contact portion from the busbar there and preferably outwards.

The functional portion can preferably comprise part of a standard interface, such as HMDI, USB, barrel plug connection, mains plug connection, network plug connection, for example for LAN cable with Power-over-Ethernet (PoE), or the like. Thus, a corresponding standard interface can also be provided in a simple manner towards the coupling opening. Because the functional portion preferably projects adjacent to or between corresponding cover elements, this functional portion can be provided in a particularly space-saving manner so that a corresponding functional area of the mounting rail system, for example a light output area of a light strip, is only slightly disrupted or interrupted.

In a preferred embodiment, the mounting rail system can comprise at least two elongate mounting rails, whereby at least one, preferably a plurality or all, of the mounting rails is a mounting rails according to the present invention is as described above. The mounting rails are preferably arranged longitudinally in series in relation to one another in order to form an arbitrarily extending and/or branched mounting rail system. Preferably, the busbars of adjacent mounting rails, preferably the electrical conductors thereof, are electrically coupled to one another.

The carrier rail system can furthermore comprise a first connection for electrically or preferably also mechanically coupling the longitudinal busbars. Alternatively or additionally, the carrier rail system further comprises a second connection for mechanically coupling the carrier profiles, preferably by corresponding coupling structures. The mounting rail system can further preferably comprise a connecting part, such as a connecting rail, which comprises at least a part of the first connection and/or of the second connection. In this way, a simple connection of the corresponding components of the mounting rail system can be provided in a simple manner.

BRIEF DESCRIPTION OF THE DRAWINGS

Further features and advantages of the present invention are described on the basis of the figures of the accompanying drawings. Shown are.

DETAILED DESCRIPTION OF THE EMBODIMENTS

Figure 1:
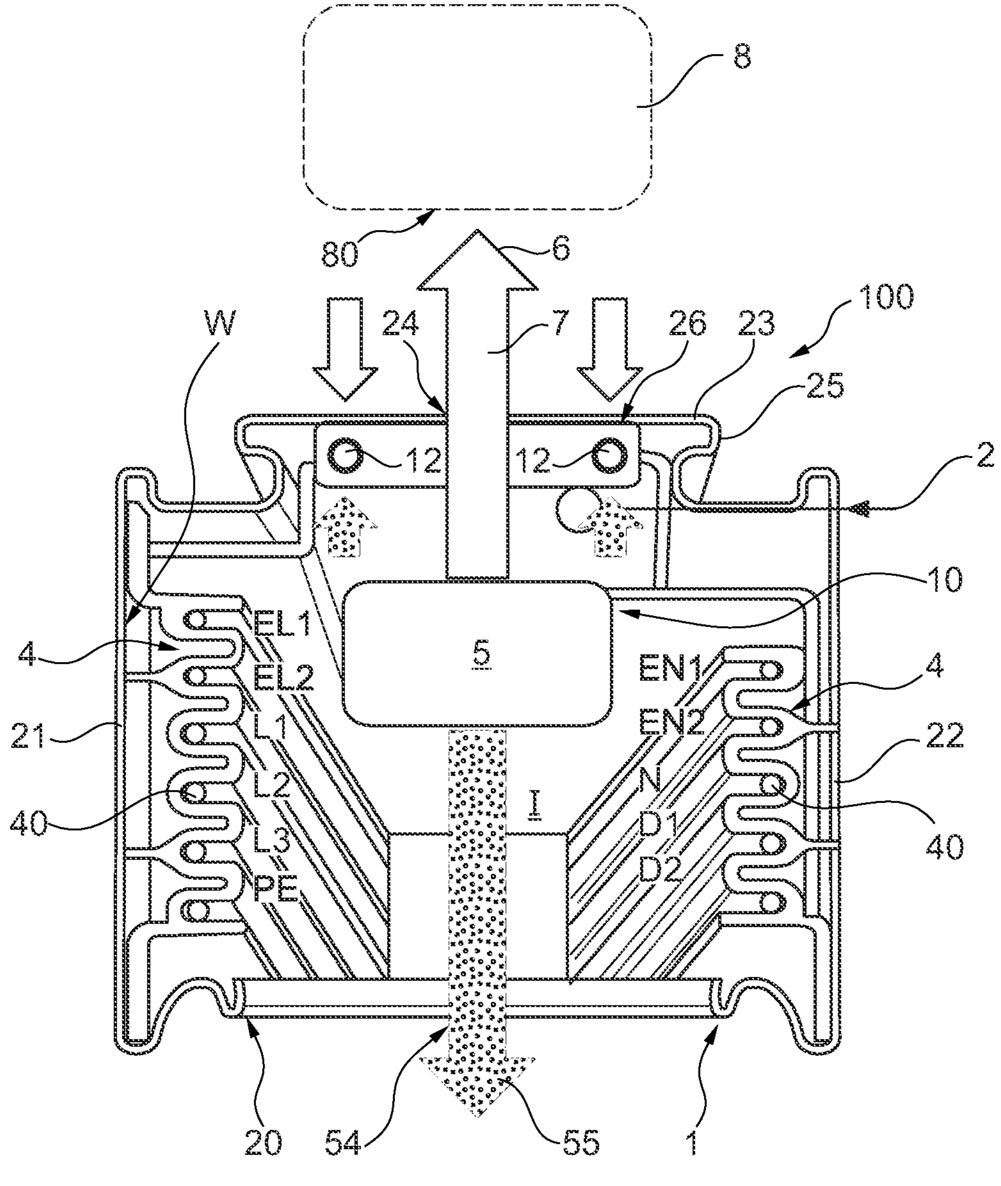
FIG. 1 is a perspective and partially schematic front view of a mounting rail system according to a first exemplary embodiment of the present invention, FIG. 2 are schematic views in front view (A) and side view (B) of a mounting rail system according to a second exemplary embodiment of the present invention.

The drawings show different embodiments of a mounting rail system 100 according to the invention as well as components thereof.

The mounting rail system 100 comprises a mounting rail 1. The mounting rail 1 in turn has an elongate profiled mounting rail 2 with a longitudinal extent L. The profiled mounting rails 2 shown in this case have a straight longitudinal extent L, for example, and thus extend along a longitudinal direction. However, it is also conceivable that the profiled mounting rail 2 comprise a differently shaped longitudinal extent L, for example an angled or curved or undulating longitudinal extent L. A direction of the longitudinal extent L thus preferably corresponds to a tangent or to the orientation of the longitudinal extent L in cross-section perpendicular to the longitudinal extent L of the considered area of the profiled mounting rail 2.

The profiled mounting rail 2 delimits an interior I and has an elongate coupling opening 20. The elongate coupling opening 20 can preferably extend over the entire length of the profiled mounting rail 2 and thus forms an open side of the profiled mounting rail 2 or of its interior I. As shown in the exemplary embodiments, the profiled mounting rail 2 is preferably U-shaped or C-shaped when viewed in cross-section in the direction of the longitudinal extent. An H-shaped or other configuration is also conceivable.

The profiled mounting rail 2 preferably comprises two substantially parallel aligned side wall legs 21, 22 and one transverse wall leg 23 connecting these side wall legs 21, 22, which preferably form the aforementioned U-shape.

Figure 16:
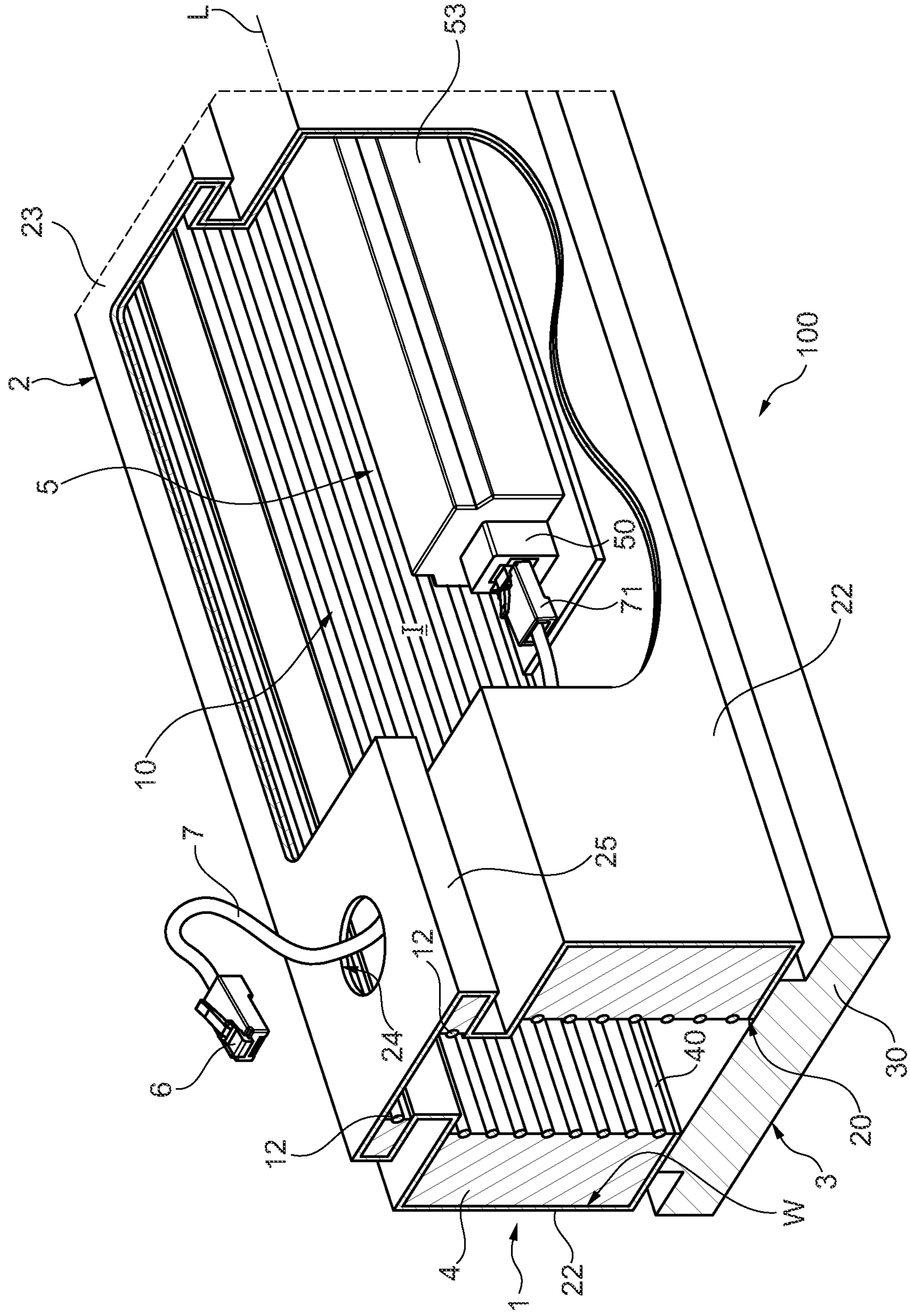
FIG. 16 is a perspective partial sectional view of a mounting rail according to the invention according to a fourth exemplary embodiment of the present invention.

The mounting rail 1 further comprises an elongate connecting element, preferably in the form of an elongate busbar 4, which extends longitudinally in the interior of the profiled mounting rail 2, for example, as shown in FIGS. 1 and 16. Furthermore, the mounting rail 4 comprises a conductor and preferably a group of conductors 40 for electrically connecting electrical or electronic components 30 via the coupling opening 20. These are preferably used for power supply and/or data transmission.

The busbar 4 is preferably arranged on an inner wall W of the profiled mounting rail 2, preferably at least on one of the legs 21, 22, 23 of the side wall legs 21, 22 and the transverse wall leg 23.

In one preferred embodiment, the mounting rail system 100 can comprise at least two or more elongate mounting rails 1, at least one or more or all of the mounting rails being a mounting rail 1 according to the present invention. The mounting rails 1 are then preferably arranged longitudinally in series with one another on the front in relation to one or more other mounting rails 1, in order to thus form an arbitrarily long and/or branched mounting rail system 100. The elongate busbars 4 of adjacent mounting rails 1 are particularly preferably electrically coupled to one another; particularly preferably via their electrical conductors 40.

The mounting rail system 100 can furthermore comprise a first connector (not shown) for electrically and preferably also mechanically coupling the elongate busbars 4. The mounting rail system 100 can preferably further comprise a second connector (not shown) for mechanically coupling the profiled mounting rails 2, preferably by corresponding coupling structures. The mounting rail system 100 can preferably comprise a connecting part (not shown), such as a connecting rail, which comprises at least a part of the first connector and/or of the second connector.

The mounting rail system 100 further comprises a tapping element 10. This is or can be detachably inserted/accommodated via the coupling opening 20 into the interior I and is (in the inserted state) or can be electrically coupled to the busbar 4 with a contact portion 5. Preferably, the contact portion 5 is completely accommodated in the interior I, as can be seen, e.g., in FIGS. 1, 2 and 10 to 13 as well as 16. Preferably, the contact portion 5 can thus be accommodated so as to be hidden in the profiled mounting rail 2.

The contact portion 5 preferably comprises a rotary tap 51 with contact elements 52, which is movable between an insertion position (see, e.g., FIG. 2B) in which the contact elements 52 are retracted and a contacting position (see, e.g., FIGS. 8-13) in which the contact elements 52 are extended for contacting the busbar 4 or its electrical conductor 40.

The tapping element 10 further comprises a supply element 6, which is or can in this case be provided in the inserted state of the tapping element 10 or in the case of a contact portion 5 inserted in the interior I, on the outside in relation to the mounting rail 1. The supply element 6 is also electrically connected to the contact portion 5 by means of a connecting element 7 via an opening 24 in the mounting rail 1 that is independent from the coupling opening 20 (i.e., in particular separate or spatially spaced/separated therefrom) in order to supply the electrical tapping of the contact portion 5 from the busbar 4 outwardly via the supply element 6, i.e., outside the mounting rail 1 or the profiled mounting rail 2. This is shown by way of example in FIGS. 1, 2, 5 as well as FIGS. 8 to 13 as well as 16.

Figure 5:
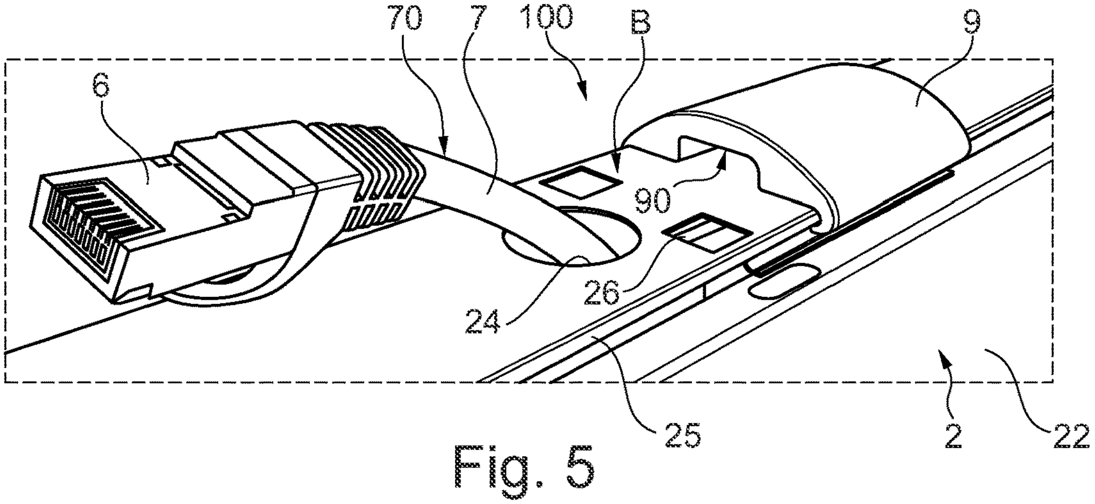
FIG. 5 is a perspective partial view of the mounting rail system according to FIG. 3 with the cover open and the connecting element guided through the opening and the supply element, in this case in the form of a part of a standard interface in the form of a network plug.
Figure 6:
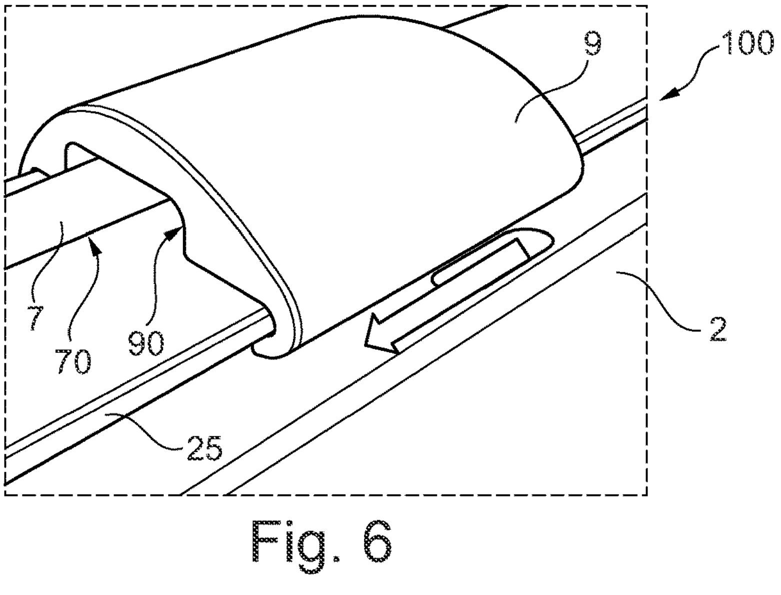
FIG. 6 is a perspective partial view of the mounting rail system according to FIG. 3 with the cover closed and the connecting element inserted, along with the supply element according to FIG. 5.
Figure 13:
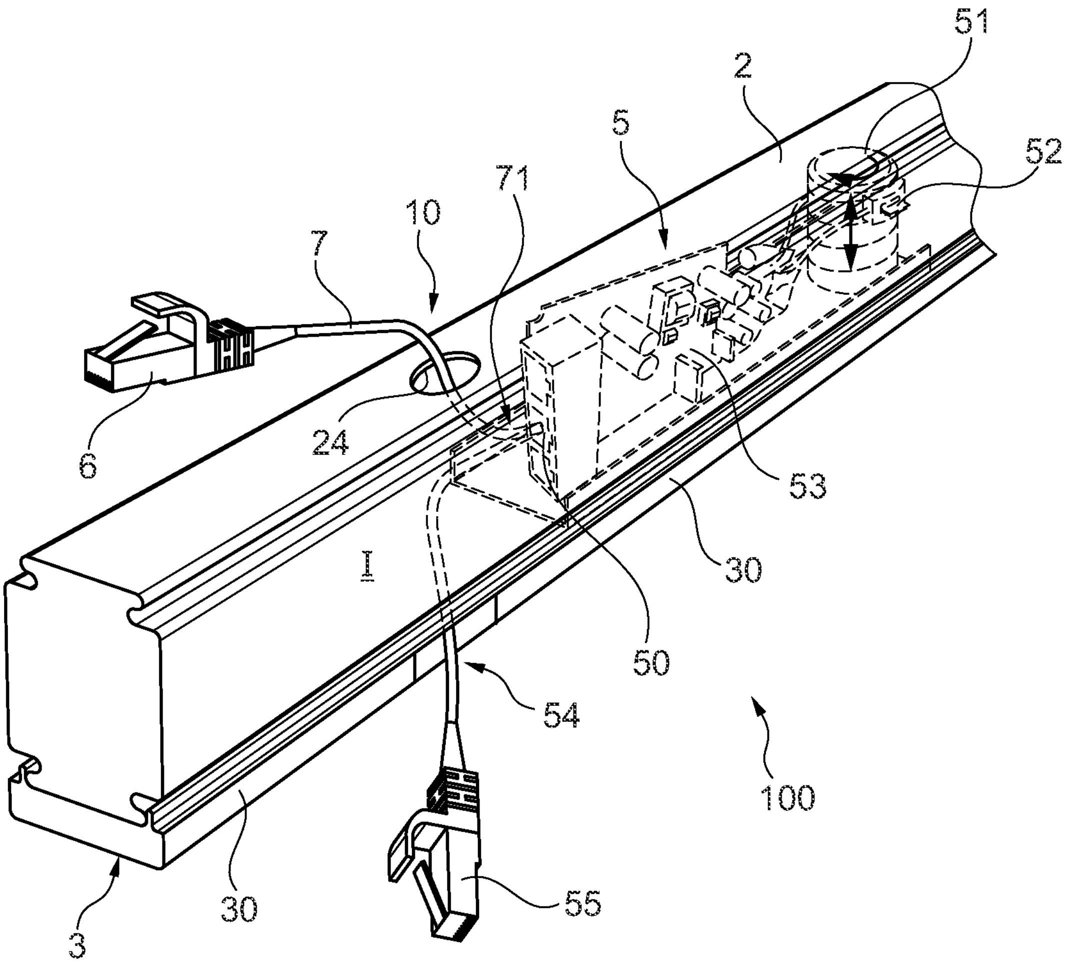
FIG. 13 is a perspective partial view of a mounting rail system according to a tenth exemplary embodiment of the present invention, in this case with a network plug as a supply element on the one hand and as a functional portion on the other hand.

Preferably, the supply element 6 can comprise a part of a standard interface. For example, FIGS. 5, 13, and 16 show a supply element 6 in the form of a network plug of a network plug connection, for example via LAN cable with Power-over-Ethernet (PoE). FIG. 9A shows an exemplary supply element 6 in the form of a barrel plug of a barrel plug connection. FIG. 9B shows an exemplary supply element 6 in the form of a USB plug of a USB interface. Other standard interfaces, such as HDMI, network plug connection (e.g., for Euro plugs or Schuko plugs, etc.) and the like are also conceivable. In particular, the part of the standard interface can preferably comprise a standardized terminal plug or terminal socket for preferably providing the electrical tapping outwardly. For example, it is also conceivable that the end of the connecting element 7 facing the supply element 6 has a corresponding part of the standard interface for electrical coupling to the part of the standard interface of the supply element. Thus, the supply element 6 and the connecting element 7 can be connected to one another via a standard interface.

Preferably, the connecting element 7 is configured as a cable or comprises a cable, as shown by way of example in FIGS. 5, 6 and 8 to 13 as well as 16. However, the connecting element 7 can also be configured in other ways, e.g., via a connecting bar, such as a rigid or flexible connecting bar.

The contact portion 5 can further comprise an adjustment portion 53 for selectively adjusting the electrical tapping from the busbar 4 towards the supply element 6. This adjustment can be, for example, an adjustment of the voltage, current, frequency, and the like of the electrical tap. For example, the adjustment portion 53 can be a transformer, an operating device, another power bridge such as a power and/or data bridge, and the like. It is also conceivable that this portion is available in the form of an adapter with Power-over-Ethernet (PoE), as exemplified by FIG. 11.

The contact portion 5, preferably the adjustment portion 53 thereof, can preferably comprise an interface portion 50, which comprises a part of a standard interface, such as HDMI, USB, barrel plug connection, mains plug connection, network plug connection, for example for LAN cables with Power-over-Ethernet (PoE). This is shown by way of example in the exemplary embodiment of FIGS. 11 and 16, where the adjustment portion 53 is in this case provided in the form of an adapter with an interface portion 50 in the form of a part of a LAN interface.

A signal can be introduced from an external source via this interface portion 50, for example. As can be seen in the exemplary embodiment of FIG. 11, an ethernet input cable 11 can preferably run within the profiled mounting rail 2, which is or can be coupled to the interface portion 50, for example.

It is also conceivable to supply the electrical tapping of the contact portion 5 from the busbar 4 (and/or the input cable 11) via the interface portion 50. The end 71 of the connection element 7 facing the contact portion 5 can then preferably comprise a corresponding part of the standard interface for electrically coupling to the part of the standard interface 50 of the contact portion 5 (in this case, e.g., a corresponding network plug).

Figure 10:
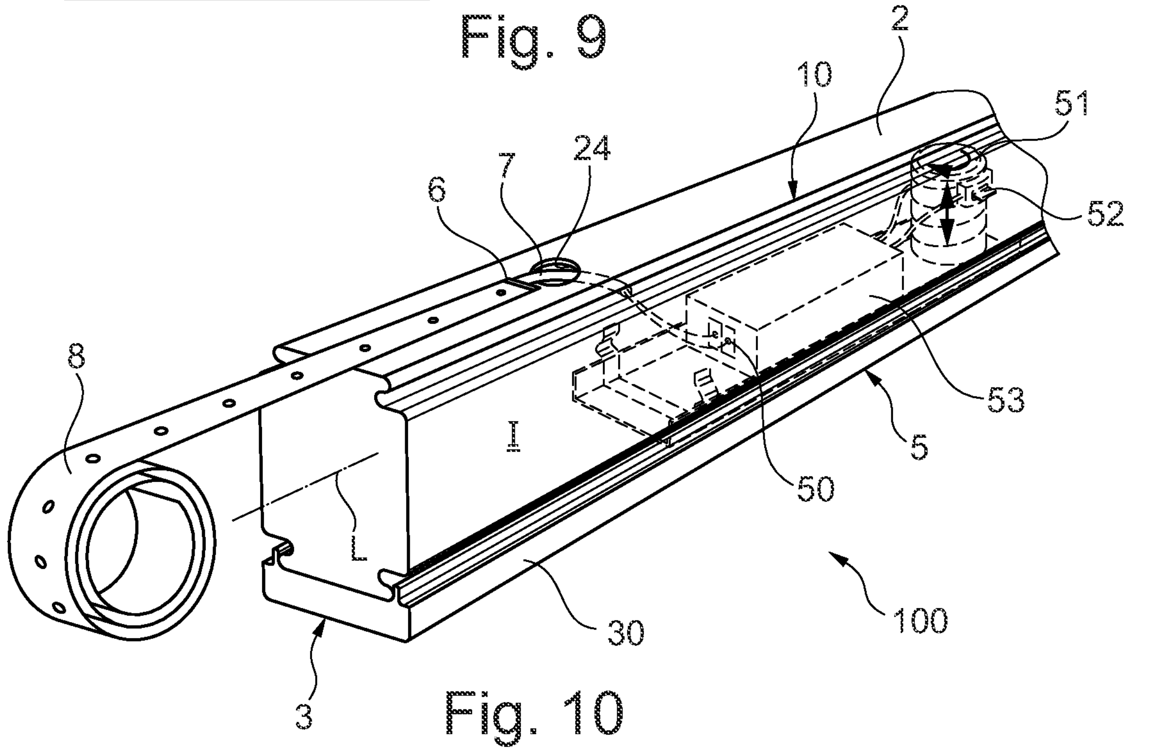
FIG. 10 is a perspective partial view of a mounting rail system according to a seventh exemplary embodiment of the present invention with an LED light strip as a supply element or as an electrical component, being coupling to the supply element (in this case, preferably integrally formed with one another)
Figure 11:
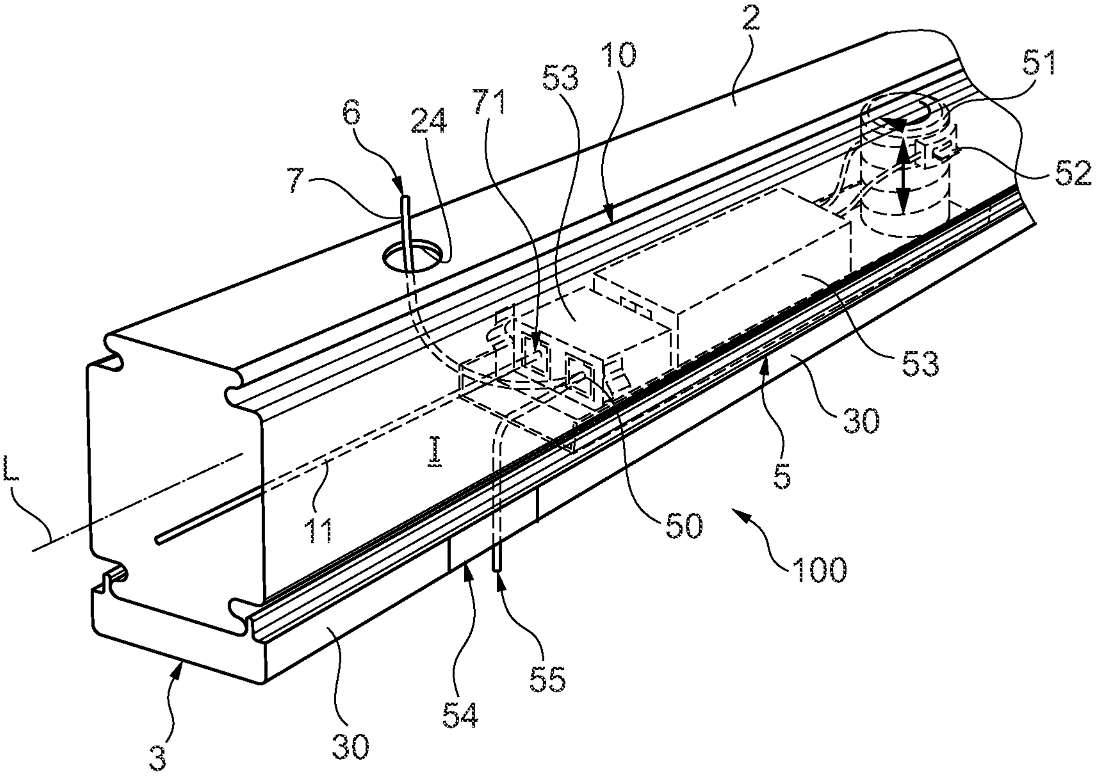
FIG. 11 is a perspective partial view of a mounting rail system according to an eighth exemplary embodiment of the present invention, in this case with an interface portion of the contact portion serving for the network plug connection, for example for LAN cables with Power-over-Ethernet (PoE)

Preferably, the mounting rail system 100 can further comprise an electrical or electronic component 8 with a terminal portion 80 for connection to the supply element 6 and thus for electrical coupling to the busbar 4. The terminal portion 80 can be configured as part of a standard interface, for example, when the supply element 6 is also configured as a corresponding part of this standard interface. The electrical or electronic component 8 can thus be coupled to the supply element 6 in a particularly straightforward manner. However, it is also conceivable that the supply element 6 is integrally formed with or comprises the connecting element 80, for example as shown in FIG. 10. There, a fixed connection is provided between the LED light strip on the one hand and the connecting element 7 on the other hand. The LED light strip can be provided as an electrical component 8 but also as a supply element 6; the latter, for example, if the supply element 6 configured in this way enables the serial connection of further LED light strips. The area connecting these elements then serves as (part of) the supply element 6.

The electrical or electronic component 8 preferably comprises an assembly portion 81 by means of which the component 8 can be mechanically coupled to the profiled mounting rail 2. The assembly portion 81 can preferably comprise profiled portions 82 for being mechanically coupled to coupling structures 25 of the profiled mounting rail 2, as can be seen for example in FIG. 7. Preferably, the profiled portions 82 allow for a longitudinal slidability of the component 8 along the length of the mounting rail 1 and the profiled mounting rail 2.

Figure 7:
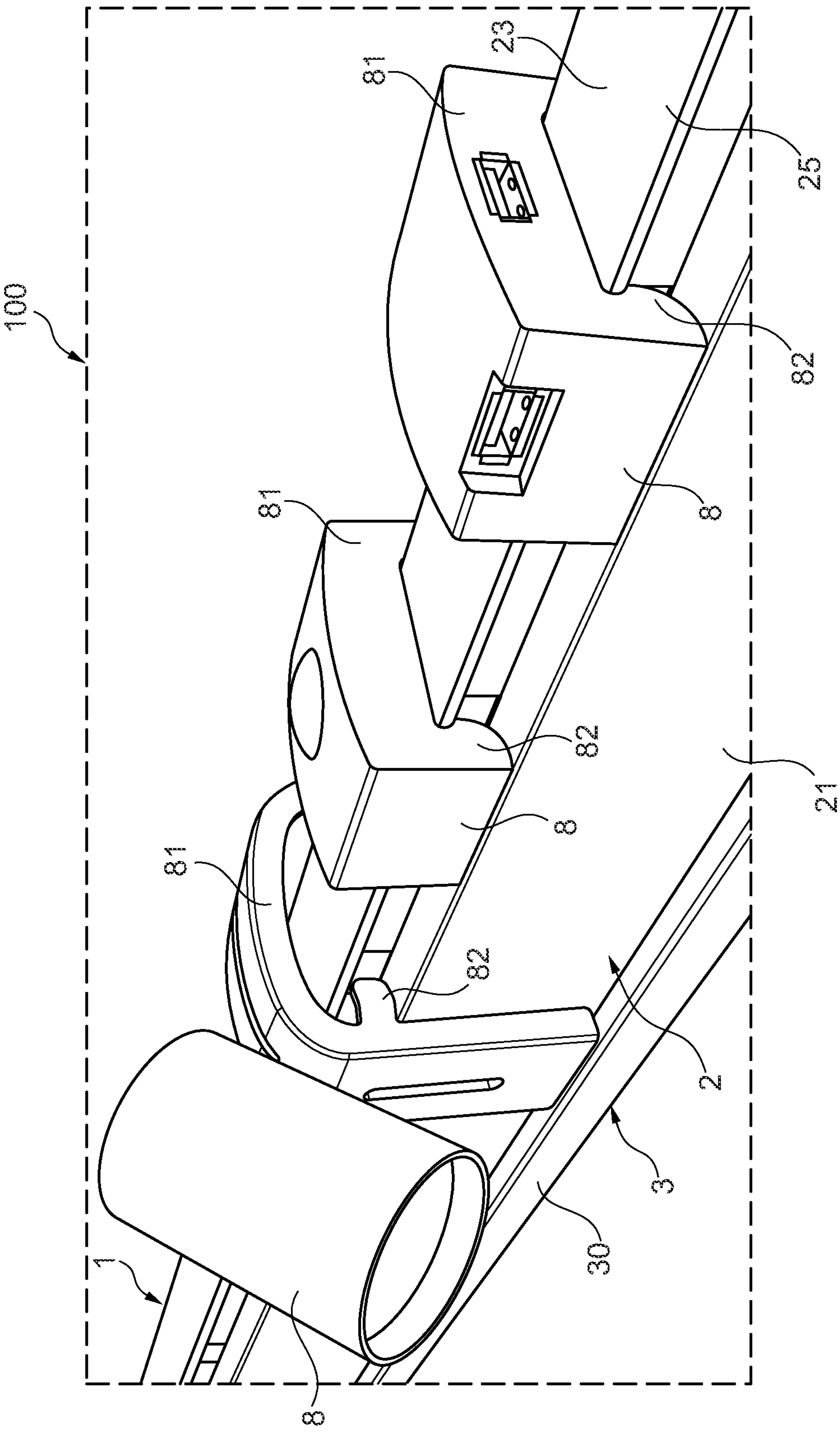
FIG. 7 is a perspective partial view of a mounting rail system according to a fourth exemplary embodiment of the present invention with electrical and electronic components provided thereon.
Figure 8:
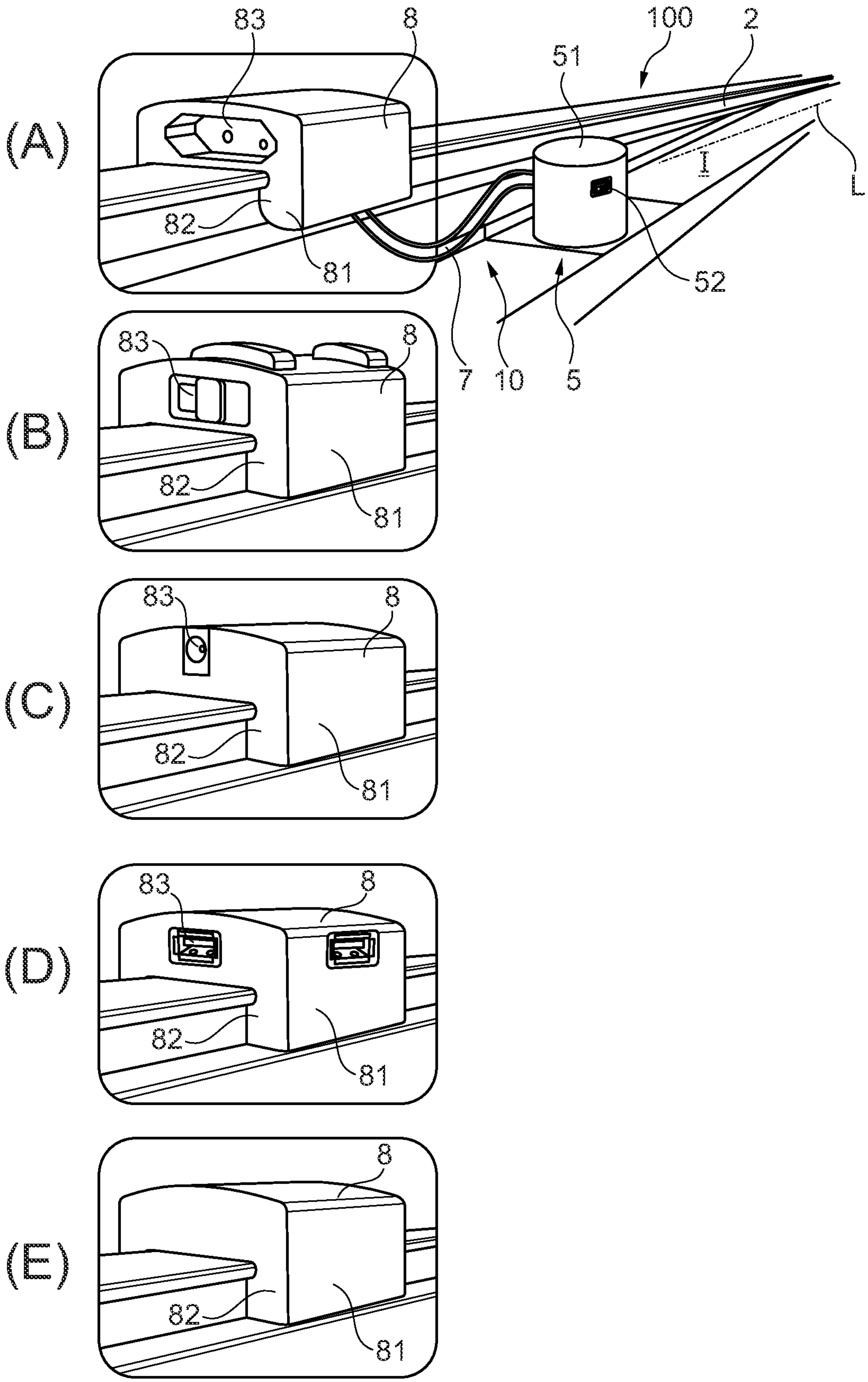
FIG. 8 is a schematic perspective view of a mounting rail system according to a fifth exemplary embodiment of the present invention with examples of different electrical or electronic components connected to the tapping element, such as an adapter with a part of a standard interface in the manner of a network plug socket (in this case for Euro plugs) (A), with electrical terminal blocks such as screw terminals (B), with a barrel plug terminal socket (C), with a USB plug socket (D), or in the form of an indirect light (E)
Figure 9:
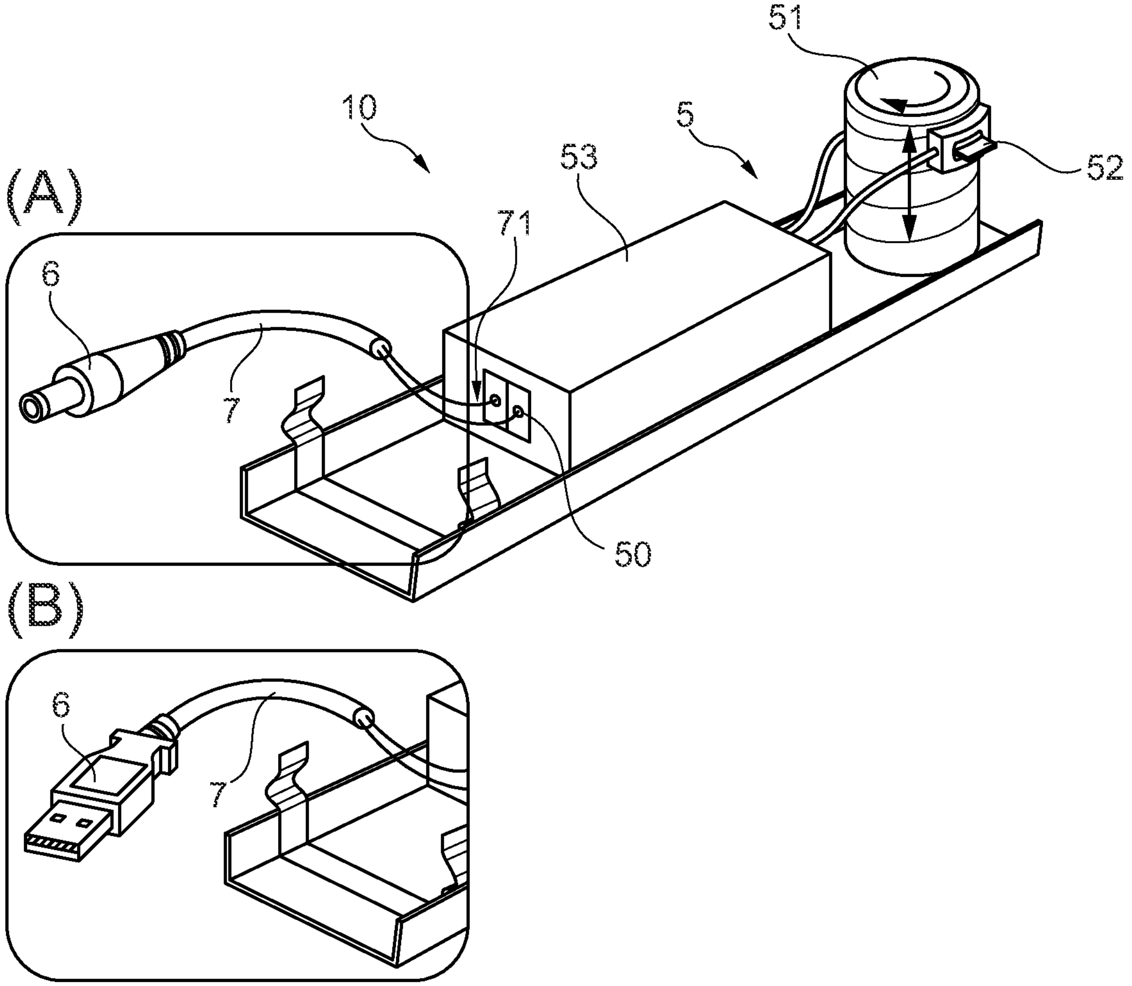
FIG. 9 is a perspective view of a mounting rail system according to a sixth exemplary embodiment of the present invention with two examples of a supply element, in this case, e.g., in the form of a part of a standard interface in the manner of a barrel plug (A) or a USB plug (B)

The assembly portion 81 preferably has a U-shape or C-shape as can be seen in the spotlight on the left of FIG. 7. The intention of this design is for the assembly portion 81 to at least partially encompass the profiled mounting rail 2; preferably for mechanical coupling to the profiled mounting rail 2. The other components 8 shown in FIG. 7 also essentially show a comparable U-shape or C-shape of the assembly portion 81.

Preferably, the electrical or electronic component 8 can be a light, in particular a spotlight (see FIG. 7 on the left) or a gooseneck light or an indirect light (see FIG. 7, center) or a wall-washer light or an emergency light, a sensor, in particular a motion sensor or a brightness sensor, a radio beacon, a WLAN repeater, a radio access point such as a WLAN access point or a 5G access point, a speaker, a camera, a fan, a fire detector, and/or an adapter (see FIG. 7 at right, FIG. 8 A-D, FIG. 12) with a part 83 of a standard interfaces, such as HMDI, USB, barrel plug connection, mains plug connection, network plug connection, e.g., for LAN cable with Power-over-Ethernet (PoE).

Figure 12:
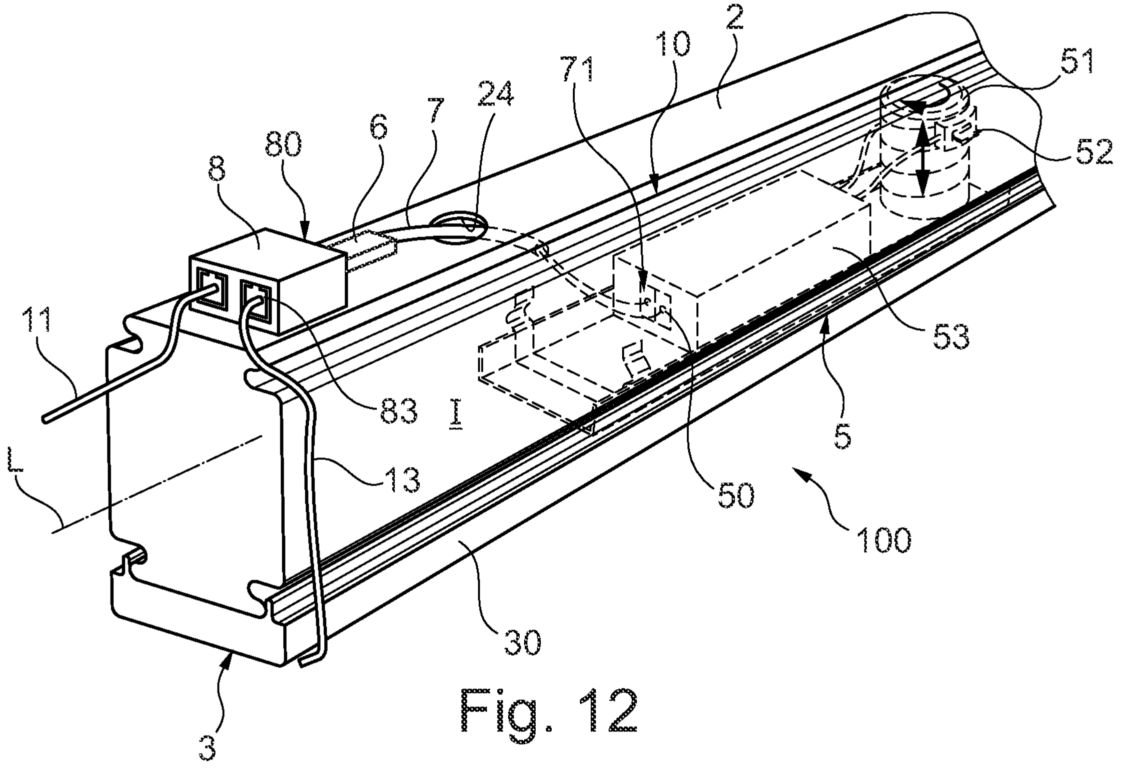
FIG. 12 is a perspective partial view of a mounting rail system according to a ninth exemplary embodiment of the present invention, in this case with an electronic component in the form of an adapter with a part of a standard interface, in this case in the form of a network plug connection, for example for LAN cables with Power-over-Ethernet (PoE)

As indicated in FIG. 12, the component 8 in the form of a aforementioned adapter can make it possible to supply any further components 8 (basically as secondary components) at any external position on or around the profiled mounting rail 2 and then connect them to the busbar 4 via the tapping element 10 via a cable 13 and preferably via the standard interface 83. Also in the form of the adapter shown in FIG. 12, a signal can be introduced into the component 8 via its standard interface 83, e.g. from the outside. As can be seen in the exemplary embodiment shown in FIG. 12, an ethernet input cable 11 can run outside of the profiled mounting rail 2 for this purpose, which is or can be coupled to the part 83 of the standard interface.

Figure 4:
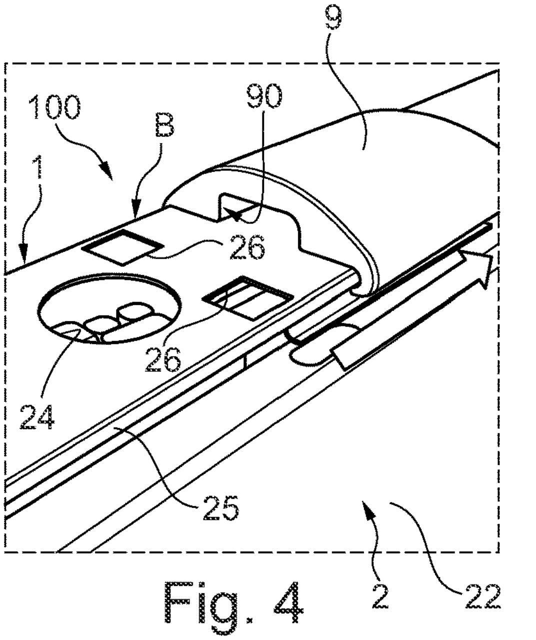
FIG. 4 is a perspective partial view of the mounting rail system according to FIG. 3, with the cover open.

The opening 24 can have any desired cross-section. In the illustrated exemplary embodiments, the opening 24 has a circular shape and thus forms a corresponding circular passage in the profiled mounting rail 2. The opening 24 is preferably provided in the transverse wall leg 23, however, alternatively or additionally, the opening 24 can also be provided in one of the other legs 21, 22. Preferably, and as shown, the opening 24 is preferably provided on a side of the profiled mounting rail 2 facing away from the coupling opening 20, as can be seen in FIG. 4 as well as 10 to 13 and 16. Preferably, it is conceivable that the profiled mounting rail 2 comprises a plurality of the openings 24, which are then preferably arranged along the length of the profiled mounting rail 2 (i.e., preferably in its longitudinal direction) and preferably evenly.

The profiled mounting rail 2 can further comprise one or more terminal openings 26 that are independent of the coupling opening 20. These can be seen by way of example in the illustration shown in FIGS. 4 and 5. The terminal openings 26 in this case have a rectangular or square shape here, but they can also have any other shape. Two terminal openings 26 are shown in this case, although only one or more can be provided. It is also conceivable that the terminal openings 26 are integrally formed with the opening 24, i.e., their contours overlap and thus form a continuous passage. The busbar 4 can, e.g., be electrically contactable from the outside via the terminal openings 26. However, it is preferably alternatively or additionally conceivable that further electrical conductors 12, which preferably extend longitudinally in the interior I, can be electrically contacted from the outside via the terminal openings 26. This is shown for example in FIG. 1 and is schematically indicated by the two small, downwardly directed black arrows on the upper right and left sides. The further electrical conductors 12 can also be electrically contactable via the interior I, as indicated by the small, upwardly directed dashed arrows on the upper right and left. The further electrical conductors 12 are preferably low voltage conductors. Lesser safety requirements are usually relevant for these compared to the electrical conductors 40 of the busbar 4, so that they can be easily provided in an accessible way.

As can also be clearly seen in FIGS. 4 and 5, the opening 24 as well as the at least one terminal opening 26 can be arranged in a defined hole pattern B. Preferably, a plurality of these hole patterns can preferably be arranged along the length of the profiled mounting rail 2; preferably evenly.

By means of the terminal opening(s) 26, it is thus possible to electrically couple electrical or electronic components 8 directly or indirectly to the busbar 4 or the further electrical conductors 12. This is preferably by simply placing the component 8 from above or behind onto the profiled mounting rail 2. The corresponding component 8 can be electrically coupled exclusively by the corresponding coupling to the busbar 4 or the further electrical conductors 12 or additionally connected via the supply element 6. Preferably, a corresponding component 8 comprises a protruding structural element which, when connecting the component 8, retracts into the opening 24 via the terminal openings 26, so as to indicate the correct orientation and the correct fit of the component 8. In this way, incorrect installation of a corresponding component 8 can be avoided with direct electrical contacting via the terminal opening 26. Overall, the opening 24 or the terminal opening(s) 26 can preferably be arranged or configured asymmetrically in order to ensure a correct installation of a component 8 connected therethrough.

In view of the exemplary embodiment shown in FIGS. 3 to 6, the mounting rail system 100 can further include a cover 9 for optionally covering the opening 24 and, if present, the associated terminal opening(s) 26. Preferably, the cover 9 is made of plastic and further preferably at least partially of a sealing material. In particular, the portions of the cover 9 which cooperate with the profiled mounting rail 2 and preferably face the opening 24 or the terminal opening 26 can be configured in a sealing fashion in order to avoid a penetration of debris, dust, and/or water via these openings 24, 26; in particular in the event that a mounting rail system 100 is to be provided with a high IP protection class The cover 9 is preferably provided so as to be rotatably and/or translationally movable. In the exemplary embodiment shown in FIGS. 3 to 6, the cover 9 is translationally movable and preferably in this case provided in a slidable manner along the length of the profiled mounting rail 2.

Preferably, the profiled mounting rail 2 comprises coupling structures 25. This can preferably be the coupling structures 25 already described above, to which the components 8 can also be fastened by means of the assembly portion 81. Likewise, these coupling structures 25 can be the same as those used in order to assemble the mounting rail system 100, e.g., on a mat or beam of a suspension system. The cover 9 can be mechanically coupled to the profiled mounting rail 2 via the coupling structures 25 and can preferably be movably supported on the profiled mounting rail 2 (in this case, longitudinally slidably).

The cover 9 can have alignment structures 90 for selectively aligning the end 70 of the connecting element 7 which is guided outwardly from the opening 24. The alignment structures 90 are preferably provided on a bottom 91 of the cover 9 facing towards the profiled mounting rail 2. Preferably, the alignment structures 90 extend in the direction of the longitudinal extent L of the profiled mounting rail 2, in order to thus align the connecting element 7, which is configured as a cable here, in the direction of the longitudinal extent L and thus conveniently place it on an outside, preferably on the rear side, of the mounting rail system 100. In this way, the connecting element 7 or the supply element 6 is in this case provided selectively on the corresponding (rear) side of the mounting rail system 100 and is thus inconspicuous and preferably positioned outside of the visible area on the mounting rail system 100 for a viewer and thus hidden, which also benefits the overall aesthetic impression of the mounting rail system.

The mounting rail system 100 further comprises at least one cover element 3, which can be detachably connected to the profiled mounting rail 2 in order to cover the coupling opening 20 at least partially or preferably completely. According to a particularly preferred embodiment, the cover element 3 further covers at least a part of the contact portion 5 outwardly, i.e., towards the coupling opening 20, in order to thus place it in a hidden manner in the interior I. This can be clearly seen, for example, in FIG. 2 as well as FIGS. 10 to 13 and 16.

The cover element 3 can be, for example, an aperture. This aperture can be provided for purely aesthetic reasons. Preferably, the aperture further serves the purpose of securely and preferably tightly covering the coupling opening 20, as well as to protect against access by a person from the outside into the interior I.

It is also conceivable that the cover element 3 is an electrical or electronic component 30. Preferably, this component 30 can be electrically couplable to the busbar 4. For example, this can also be achieved via a rotary tap with contact elements comparable to those of the contact portion 5, as previously described. The component 30 is preferably a light, in particular a light strip or a spotlight, an operating device, and/or a sensor, in particular a motion sensor or a brightness sensor, or the like.

Figure 14:
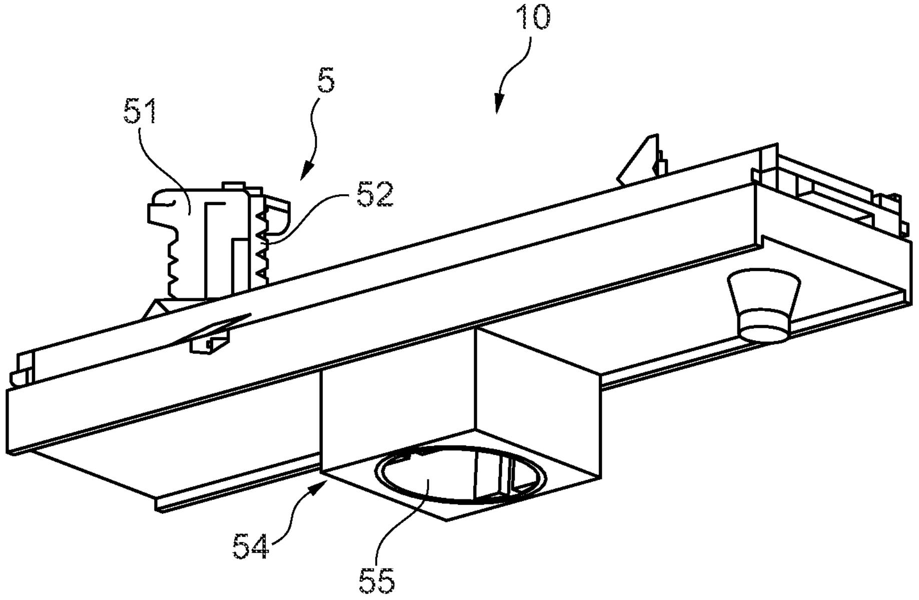
FIG. 14 is a perspective view of a tapping element for a mounting rail system according to an eleventh exemplary embodiment of the present invention, in this case with a functional element with a functional portion in the form of an outlet for a Schuko plug.
Figure 15:
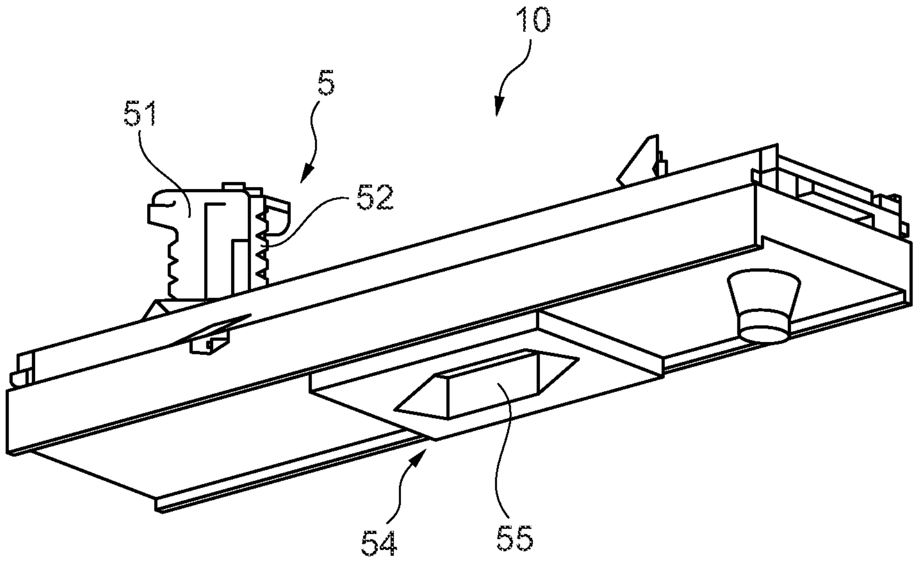
FIG. 15 is a perspective view of a tapping element for a mounting rail system according to a twelfth exemplary embodiment of the present invention, in this case with a functional element with a functional portion in the form of an outlet for a Euro plug.

The tapping element 10 can further comprise a functional element 54 having a functional portion 55 for providing the electrical tapping of the contact portion 5 from the busbar 4. Such a functional portion 55 is shown schematically in FIGS. 1, 2, and 11. In FIG. 13, this functional element 54 is shown by way of example as a cable with a network plug as the functional portion 55. In FIGS. 14 and 15, the functional portion 55 is shown in this case as an outlet for a Schuko plug (FIG. 14) or a Euro plug (FIG. 15).

Figure 2:
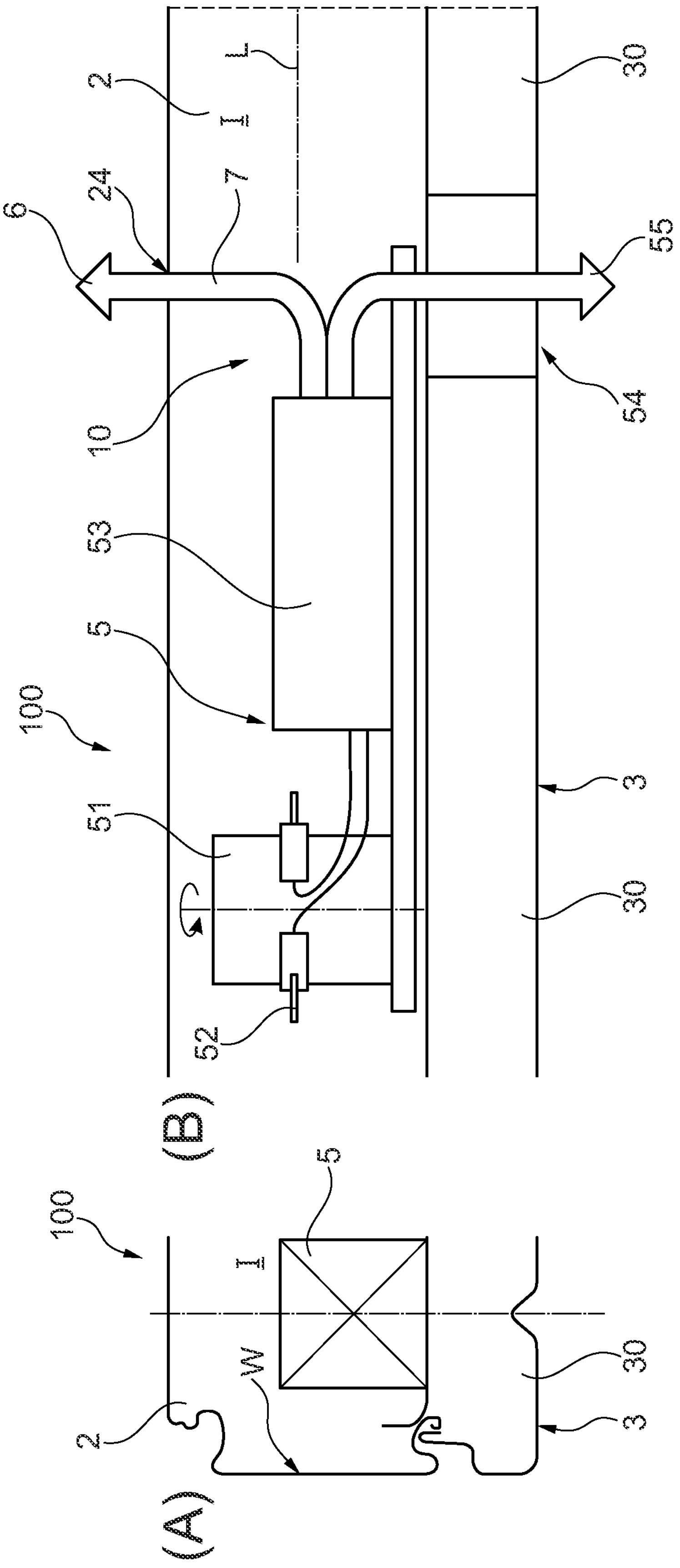
Figure 3:
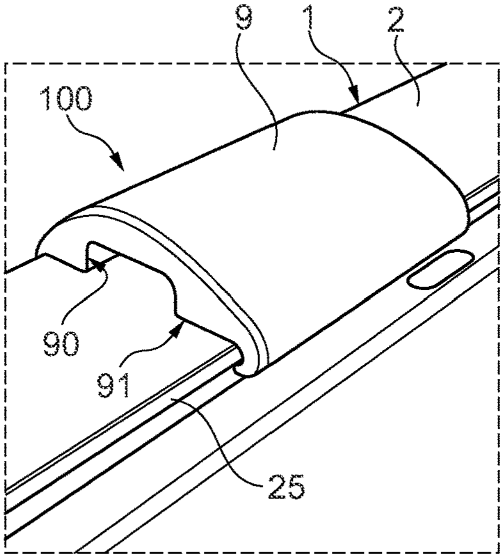
FIG. 3 is a perspective partial view of a mounting rail system according to a third exemplary embodiment of the present invention, with a cover closed.

Preferably, the functional portion 55 is provided so as to be exposed to the outside via the coupling opening 20 when the tapping element 10 is assembled, as exemplified in FIGS. 2 and 13. Preferably, the functional portion 55 is arranged so as to be laterally adjacent to at least one of the cover elements 3, if present, in relation to the direction of the longitudinal extent L, as can be seen schematically in FIG. 2.

As noted previously, the functional portion 55 can be a part of, or can comprise, a standard interface, such as HMDI, USB, barrel plug connection, mains plug connection, network plug connection, for example for LAN cable with Power-over-Ethernet (PoE), or the like.

The present invention is not limited by the aforementioned exemplary embodiments to the extent to which it is covered by the subject matter of the following claims. It is in particular possible to combine and interchange all features of the exemplary embodiments with and among one another in any manner. For example, any combination of tapping elements 10 can be provided in and on the mounting rail system 100. Any type and combination of components 8 and cover elements 3 can also be given. For example, the number, shape, and position of the openings 24 as well as the terminal openings 26 are not limited by the present invention. In addition, it is conceivable, for example, that the supply element 6 can be detachably or undetachably connected to a corresponding component 8. The component 8 can also itself be part of the supply element 6; or the latter can comprise a component 8.

The invention claimed is:

1. A mounting rail system (100) comprising:
a mounting rail (1) with
an elongate profiled mounting rail (2), which has a longitudinal extent (L), delimits an interior (I) and has an elongate coupling opening (20), and
an elongate busbar (4), which extends longitudinally (L) in the interior (I) of the profiled mounting rail (2), wherein the busbar (4) has at least one electrical conductor (40) for electrically connecting electrical or electronic components (30) via the coupling opening (20), and
a tapping element (10), which is detachably inserted into the interior (I) via the coupling opening (20) and by way of a contact portion (5) is electrically coupled to the busbar (4)
wherein the tapping element (10) further has a supply element (6), which is provided on the outside in relation to the mounting rail (1) and is electrically connected by way of electrical connecting element (7) to the contact portion (5) via an opening (24), independent of the coupling opening (20), in the profiled mounting rail (2) in order to supply the electrical tapping by the contact portion (5) from the busbar (4) via the supply element (6) on the outside; and
the mounting rail system further comprises a cover (9), wherein the cover (9) is provided for optionally covering the opening (24).

2. The mounting rail system (100) according to claim 1, wherein the contact portion (5) is completely accommodated in the interior (I), and/or
wherein the contact portion (5) comprises a rotary tap (51) with contact elements (52), which is movable between an insertion position in which the contact elements (52) are retracted and a contacting position in which the contact elements (52) are extended for contacting with the busbar (4).

3. The mounting rail system (100) according to claim 1, wherein the supply element (6) comprises a part of a standard interface, preferably a standardized socket or plug, in order to supply the electrical tap outwardly wherein the end (70) of the connecting element (7) facing the supply element (6) preferably comprises a corresponding part of the standard interface for electrically coupling to the part of the standard interface.

4. The mounting rail system (100) according to claim 1, wherein the opening (24) is provided on a side of the profiled mounting rail (2) facing away from the coupling opening (20).

5. The mounting rail system (100) according to claim 1, wherein the profiled mounting rail (2) comprises a plurality of the openings (24), which are preferably arranged so as to be distributed, preferably evenly, along the length (L) of the profiled mounting rail (2).

6. The mounting rail system (100) according to claim 1, wherein the cover (9) optionally covers associated terminal opening(s).

7. The mounting rail system (100) according to claim 1, wherein the profiled mounting rail (2) is U-shaped or C-shaped or H-shaped in cross-section in the direction of the longitudinal extent (L).

8. The mounting rail system (100) according to claim 1, further comprising an electrical or electronic component (8),
wherein the electrical or electronic component (8) comprises a terminal portion (80) for connecting to the supply element (6) and thus for electrical coupling to the busbar (4) and/or for direct electrical connection to the busbar (4) and/or the further electrical conductor (12) via the terminal openings (26).

9. The mounting rail system (100) according to claim 1, further comprising at least one cover element (3),
wherein the cover element (3) is detachably connectable to the profiled mounting rail (2), in order to at least partially cover the coupling opening (20), and wherein the cover element (3) further covers at least a part of the contact portion (5).

10. The mounting rail system (100) according to claim 1, wherein the tapping element (10) further comprises a functional element (54) having a functional portion (55) in order to supply the electrical tapping of the contact portion (5) from the busbar (4), wherein the functional portion (55) is preferably provided so as to be exposed outwardly when the tapping element (10) is assembled via the coupling opening (20) and preferably arranged laterally adjacent in relation to the longitudinal extent (L) to at least one of the cover elements (3), if present.

11. The mounting rail system (100) according to claim 1 wherein the contact portion (5) comprises an adjustment portion (53) in order to adjust the electrical tap from the busbar (4) towards the supply element (6), and in particular to voltage, power, and/or frequency.

12. The mounting rail system (100) according to claim 1 wherein the opening (24) as well as at least one terminal opening (26) are arranged in a defined hole pattern, wherein a plurality of these hole patterns are arranged so as to be distributed evenly along the length (L) of the profiled mounting rail (2).

13. The mounting rail system (100) according to claim 1 wherein the profiled mounting rail (2), independently of the coupling opening (20), further comprises one or more terminal openings (26) which extend longitudinally (L) in the interior (I) and is/are electrically contactable from the outside.

14. The mounting rail system (100) according to claim 1 wherein the cover (9) is provided so as to be rotatably and/or longitudinally slidable along the profiled mounting rail (2).

15. The mounting rail system (100) according to claim 1 wherein the profiled mounting rail (2) comprises coupling structures (25), via which the cover (9) is mechanically coupled to the profiled mounting rail (2) and is movably supported on the profiled mounting rail (2).

16. The mounting rail system (100) according to claim 1 wherein the profiled mounting rail (2) comprises two substantially parallel side wall legs (21, 22) and a transverse wall leg (23) connecting these side wall legs (21, 22), wherein the opening (24) is provided in the transverse wall leg (23).

17. The mounting rail system (100) according to claim 1 wherein the electrical or electronic component (8) is a light, in particular a spotlight or a gooseneck light or an indirect light or a wall-washer light or an emergency light, a motion sensor or a brightness sensor, a radio beacon, a WLAN repeater, a radio access point (access point) such as a WLAN access point or a 5G access point, a speaker, a camera, a fan, a fire detector, and/or an adapter having a part (83) of a standard interface.

18. A mounting rail system (100) comprising:
a mounting rail (1) with an elongate profiled mounting rail (2), which has a longitudinal extent (L), delimits an interior (I) and has an elongate coupling opening (20), and an elongate busbar (4), which extends longitudinally (L) in the interior (I) of the profiled mounting rail (2), wherein the busbar (4) has at least one electrical conductor (40) for electrically connecting electrical or electronic components (30) via the coupling opening (20), and a tapping element (10), which is detachably inserted into the interior (I) via the coupling opening (20) and by way of a contact portion (5) is electrically coupled to the busbar (4), wherein the tapping element (10) further has a supply element (6), which is provided on the outside in relation to the mounting rail (1) and is electrically connected by way of electrical connecting element (7) to the contact portion (5) via an opening (24), independent of the coupling opening (20), in the profiled mounting rail (2) in order to supply the electrical tapping by the contact portion (5) from the busbar (4) via the supply element (6) on the outside;

wherein an adjustment portion (53) of the contact portion (5) has an interface portion (50), which comprises a part of a standard interface, wherein the end (71) of the connecting element (7) facing the contact portion (5) comprises a corresponding part of the standard interface for electrical coupling to the part of the standard interface.

19. A mounting rail system (100) comprising:

a mounting rail (1) with an elongate profiled mounting rail (2), which has a longitudinal extent (L), delimits an interior (I) and has an elongate coupling opening (20), and an elongate busbar (4), which extends longitudinally (L) in the interior (I) of the profiled mounting rail (2), wherein the busbar (4) has at least one electrical conductor (40) for electrically connecting electrical or electronic components (30) via the coupling opening (20), and a tapping element (10), which is detachably inserted into the interior (I) via the coupling opening (20) and by way of a contact portion (5) is electrically coupled to the busbar (4)

wherein the tapping element (10) further has a supply element (6), which is provided on the outside in relation to the mounting rail (1) and is electrically connected by way of electrical connecting element (7) to the contact portion (5) via an opening (24), independent of the coupling opening (20), in the profiled mounting rail (2) in order to supply the electrical tapping by the contact portion (5) from the busbar (4) via the supply element (6) on the outside; and wherein a cover (9) comprises alignment structures (90) at a bottom (91) facing the profiled mounting rail (2), in order to selectively align the end (70) of the connecting element (7) which is guided outwardly from the opening (24), wherein the alignment structures (90) extend along the length (L) of the profiled mounting rail (2).

20. A mounting rail system (100) comprising:

a mounting rail (1) with an elongate profiled mounting rail (2), which has a longitudinal extent (L), delimits an interior (I) and has an elongate coupling opening (20), and an elongate busbar (4), which extends longitudinally (L) in the interior (I) of the profiled mounting rail (2), wherein the busbar (4) has at least one electrical conductor (40) for electrically connecting electrical or electronic components (30) via the coupling opening (20), and a tapping element (10), which is detachably inserted into the interior (I) via the coupling opening (20) and by way of a contact portion (5) is electrically coupled to the busbar (4)

wherein the tapping element (10) further has a supply element (6), which is provided on the outside in relation to the mounting rail (1) and is electrically connected by way of electrical connecting element (7) to the contact portion (5) via an opening (24), independent of the coupling opening (20), in the profiled mounting rail (2) in order to supply the electrical tapping by the contact portion (5) from the busbar (4) via the supply element (6) on the outside; and wherein the electrical or electronic component (8) comprises an assembly portion (81), by means of which the component (8) can be mechanically coupled to the profiled mounting rail (2), wherein the assembly portion (81) comprises profiled portions (82) in order to be mechanically coupled to the coupling structures (25), or further coupling structures, of the profiled mounting rail (2), slidably along the length (L) of the profiled mounting rail (2).

* * * * *